(12) United States Patent
Ökvist et al.

(10) Patent No.: US 9,137,692 B2
(45) Date of Patent: Sep. 15, 2015

(54) LOAD ESTIMATION IN A USER EQUIPMENT

(75) Inventors: Peter Ökvist, Luleå (SE); Tomas Jönsson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/985,701

(22) PCT Filed: Mar. 1, 2011

(86) PCT No.: PCT/SE2011/050230
§ 371 (c)(1),
(2), (4) Date: Aug. 15, 2013

(87) PCT Pub. No.: WO2012/118414
PCT Pub. Date: Sep. 7, 2012

(65) Prior Publication Data
US 2013/0324108 A1    Dec. 5, 2013

(51) Int. Cl.
H04W 24/08    (2009.01)
H04L 1/20     (2006.01)
H04L 1/00     (2006.01)
H04B 17/327   (2015.01)
H04W 72/08    (2009.01)

(52) U.S. Cl.
CPC ............ *H04W 24/08* (2013.01); *H04B 17/327* (2015.01); *H04L 1/0077* (2013.01); *H04L 1/20* (2013.01); *H04W 72/082* (2013.01)

(58) Field of Classification Search
USPC ............................ 370/252, 230, 253; 455/423
See application file for complete search history.

(56) References Cited

U.S. PATENT DOCUMENTS

| 2008/0240217 A1 | 10/2008 | Lee et al. |
| 2010/0309797 A1* | 12/2010 | Lindoff et al. ............... 370/252 |
| 2012/0052828 A1* | 3/2012 | Kamel et al. ............... 455/226.2 |

FOREIGN PATENT DOCUMENTS

| EP | 1 835 636 A2 | 9/2007 |
| WO | 2001091495 A1 | 11/2001 |
| WO | 2005060209 A1 | 6/2005 |
| WO | 2007021159 A2 | 2/2007 |
| WO | 2008088257 A1 | 7/2008 |
| WO | WO 2009092689 A1 * | 7/2009 |

OTHER PUBLICATIONS

International Search Report and Written Opinion dated Nov. 24, 2011 for International Application No. PCT/SE2011/050230; International Filing Date: Mar. 1, 2011 consisting of 12-pages.
3GPP TSG-RAN WG1 #57bis, R1-092833, Source CHTTL, "Discussions on CoMP Cooperating Set", Los Angeles, USA, Jun. 29-Jul. 3, 2009; Section 2.2 consisting of 5-pages.

(Continued)

*Primary Examiner* — Daniel Lai
(74) *Attorney, Agent, or Firm* — Christopher & Weisberg, P.A.

(57) ABSTRACT

The embodiments of the present invention relates to a method UE and UE for estimating a relative interference load in an LTE network. This is accomplished by comparing a load measure based on a RSRP-based geometry measure and UE-measured CINR. Constructing a measure by calculating the corresponding quotient provides an estimation of the relative load in the network, more specifically the load in neighboring cells.

16 Claims, 3 Drawing Sheets

(56) References Cited

OTHER PUBLICATIONS

Gunnarsson, F.; Geijer-Lundin, E.; Bark, G.; Wiberg, N.; ,"Uplink admission control in WCDMA based on relative load estimates," Communications, 2002. ICC 2002. IEEE International Conference on , vol. 5, No., pp. 3091-3095 vol. 5, 2002 doi: 10.11 09/ICC.2002. 997407 URL: http://ieeexplore.ieee.org/stamp/stamp.jsp?tp=&arnumber=997407&isnumber=21518; abstract; Section I consisting of 1-page. (Aug. 7, 2002).

International Search Report dated Nov. 24, 2011 for International Application No. PCT/SE2011/050230; International Filing Date: Mar. 1, 2011 consisting of 5-pages.

* cited by examiner

LOAD ESTIMATION IN A USER EQUIPMENT

TECHNICAL FIELD

The embodiments of the present invention relate to a method and user equipment (UE) in a cellular communication network for estimating a relative load.

BACKGROUND

In cellular communication networks such as Long Term Evolution (LTE) networks, it is desired to be able to estimate a relative load in the radio network from the user equipment (UE) without having access to network information. The relative load implies how much of the available radio resources which is occupied by traffic, regarding interference. Such load estimations may be used for input to algorithms, feedback to the network, creating possibilities for load based radio resource management algorithms and for throughput prediction.

There is currently no known method to estimate load in neighboring cells applicable for LTE. Further, there is no standardized method or measure available in the system that reflects what relative load the interference load situation corresponds to.

SUMMARY

The embodiments of the present invention utilize the measurements available in an LTE UE to establish an estimation of the relative system load (interference load).

This is accomplished by comparing a load measure based on a RSRP-based geometry measure and UE-measured CINR. Constructing a measure by calculating the corresponding quotient provides an estimation of the relative load in the network, more specifically the load in neighboring cells.

According to a first aspect of embodiments of the present invention a method in a UE for estimating a relative load in a network is provided. The network comprises a plurality of base stations and one of the base station is a serving base station to the UE. In the method, RSRP is measured for all base stations the UE detects and a CINR is measured. A geometry measure (G) is determined wherein G is equal to RSRP for the serving cell divided by a sum of RSRP for remaining base stations that the UE detects. The CINR at full load is estimated by using the G and the relative load is estimated by dividing G by CINR.

According to a second aspect of embodiments of the present invention, a UE for estimating a relative load in a network is provided. The network comprises a plurality of base stations and one of the base station is a serving base station to the UE. The UE comprises a detector configured to measure RSRP for all base stations the UE detects, and to measure a CINR. Further a processor is provided which is configured to determine a geometry measure, G, wherein G is equal to RSRP for the serving cell divided by a sum of RSRP for remaining base stations that the UE detects. The processor is further configured to estimate the CINR at full load by using the geometry measure, G, and to estimate the relative load by dividing G by CINR.

An advantage with embodiments of the present invention is that the embodiments utilize the fact that an existing LTE UE measures and monitors RSRP for all detected neighbors and CINR for the serving cell. By using the RSRP, the UE has the possibility to create a good estimate of the geometry G, which estimates the CINR at full load.

DETAILED DESCRIPTION

Figure 1:
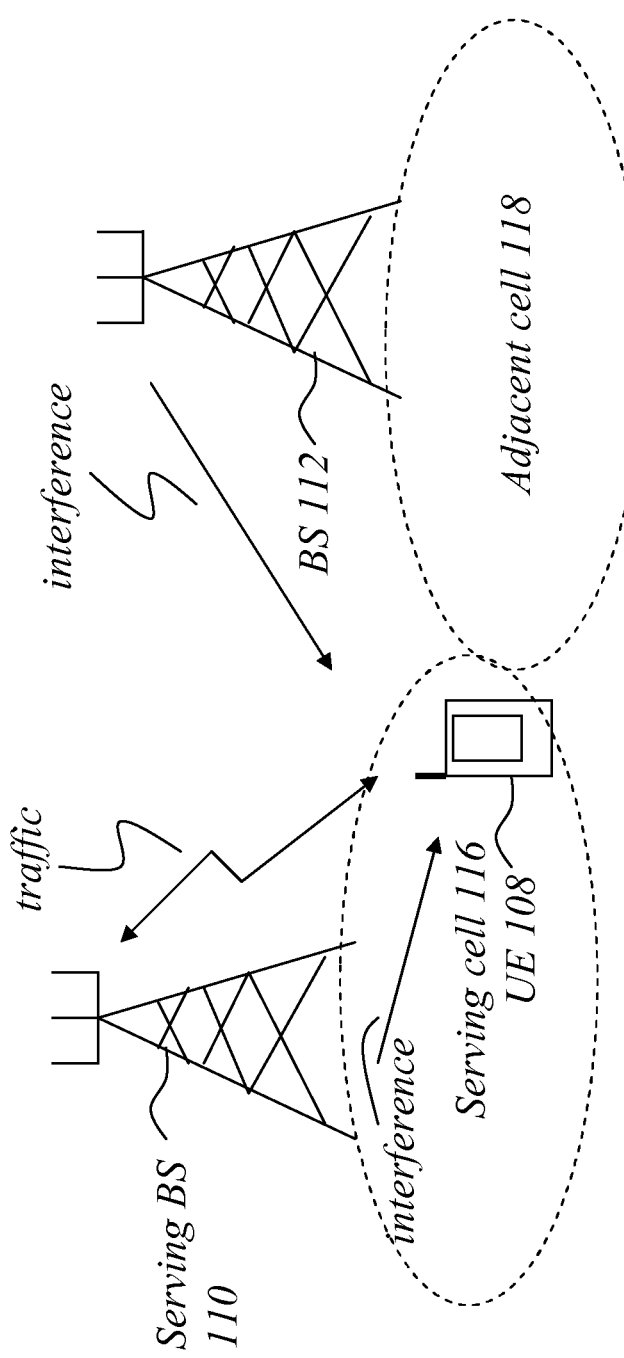
FIG. 1 illustrates a cellular network wherein the embodiments of the present invention may be implemented.

FIG. 1 illustrates a cellular network wherein the embodiments of the present invention may be implemented. FIG. 1 shows two base stations 110,112, also referred to as eNB in LTE networks, wherein a UE 108 is connected to one of the base stations 110 which is the serving base station. Surrounding base stations 112 cause interference to the UE 108 as communication between the serving base station 110 and other UEs in the same cell 116 occurs. Accordingly, the UE 108 transmits/receives traffic to/from the serving base station 110 on traffic channels and at the same time is exposed to interference. As mentioned above, it is desired to be able to measure the load, wherein the load implies how much of the radio resources which is occupied by traffic.

In LTE, Reference Symbol Carrier to Interference and Noise Ratio (RS CINR) is measured by the UE, and provides an estimation of the carrier to interference and noise ratio (CINR) on the traffic channels provided that reference symbols are not synchronized thus not colliding synchronously at all times.

Further, the UE measures Reference Symbol Received Power (RSRP) for all neighboring cells it detects. This is for example used for handover purpose so that the UE can report which cell that it hears best.

The measured RSRP can be used to assemble a geometry measure. The geometry measure is according to one embodiment built by calculating the quotient of RSRP from own serving cell divided by the sum of RSRP for all other neighboring cells as shown below:

$$G = \frac{RSRP_{own\ cell}}{\sum RSRP_{other\ cells}}$$

According to a further embodiment, the geometry measure built by calculating the quotient of RSRP from own serving cell divided by the sum of RSRP for all other neighboring cells plus additional noise as shown below:

$$G = \frac{RSRP_{own\ cell}}{\sum RSRP_{other\ cells} + \text{noise}}$$

The solution of embodiments of the present invention utilizes the fact that the geometry factor is a good estimation of CINR in a full-load situation. Full-load situation implies that all radio resources in all cells are occupied by traffic.

As G is a good estimate of the CINR at full load, G can therefore be combined with current CINR to estimate the current relative load. I.e., the relative load is G/CINR since this G indicates the carrier to interference ratio at full load and the current CINR indicates the load until the network is full. Accordingly, relative load implies that the load is determined relative the full load, and full load is the load when there is no more room for additional traffic in the radio network. The relative load is typically measured in percentage. According to embodiments, the load is determined as a straight linear quotient of G and the CINR, as shown below:

$$\text{Load} = \frac{G}{CINR}$$

For example, G="−70 dBm"/"−73 dB"=−70 dBm−(−73 dBm)=3 dB which is equal to G=100 nW/50 nW=2. CINR is measured to 9 dB which is equal to 8. L=G/CINR=2/8=0, 25=25%. If the surrounding interference increases, CINR decreases. Given same geometry factor, a 4 dB CINR corresponds to 80% interference load, which is the sum of all interference that the UE is subject to.

Figure 2:
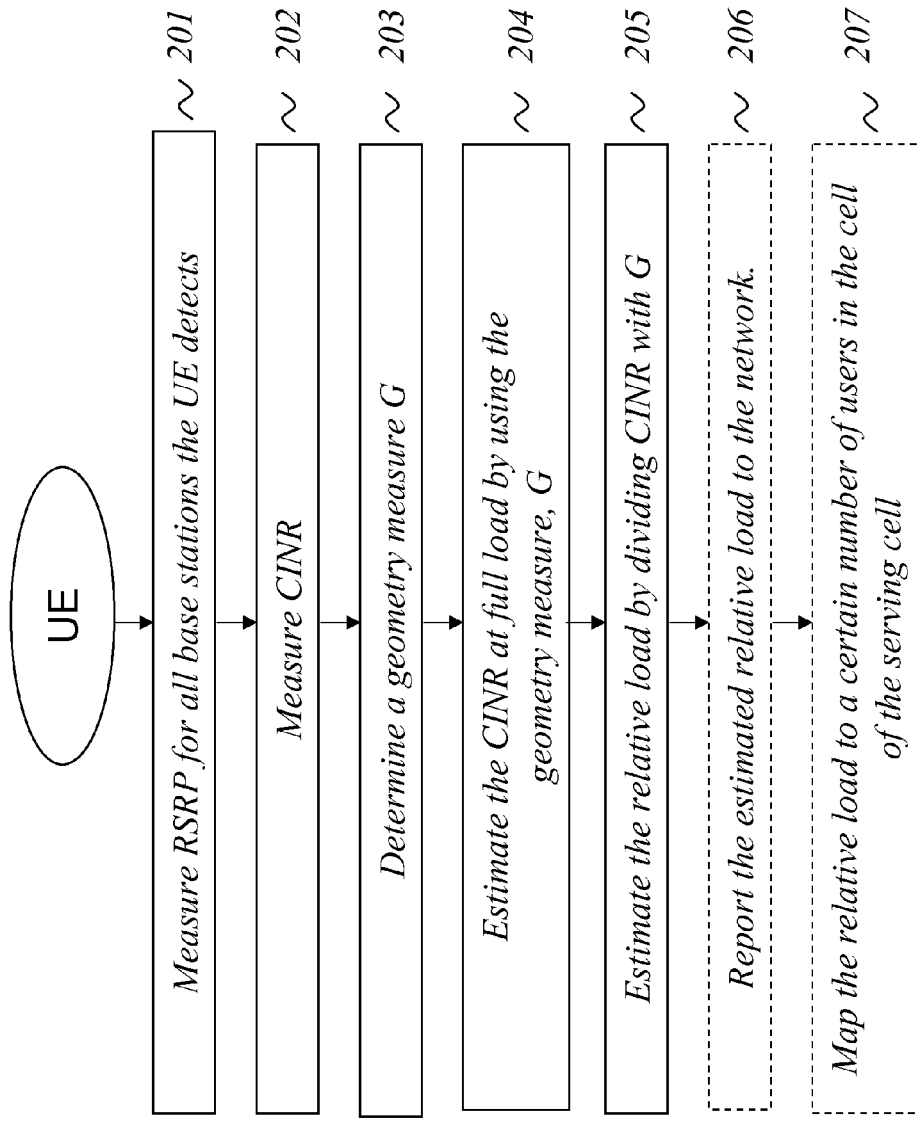
FIG. 2 is a flowchart of a method according to an embodiment of the present invention.

Turning now to FIG. 2 showing that a method in a UE is provided, wherein the UE measures 201,202 the RSRP and the CINR. The UE determines 203 a geometry measure (G) wherein G is equal to RSRP for the serving cell divided by a sum of RSRP for remaining base stations that the UE detects and divides the determined G with the CINR. According to a further embodiment the UE determines 203 a geometry measure (G) wherein G is equal to RSRP for the serving cell divided by a sum of RSRP for remaining base stations that the UE detects plus additional noise as in the formula below:

$$G = \frac{RSRP_{own\ cell}}{\sum RSRP_{other\ cells} + \text{noise}}$$

The CINR at full load is estimated 204 by using the geometry measure, i.e. CINR at full load is estimated to be G. The relative load is then estimated 205 by dividing G by CINR. The estimated relative load may then be reported 206 to the network.

Thus, in this way an estimate of the relative network load is obtained.

Figure 3:
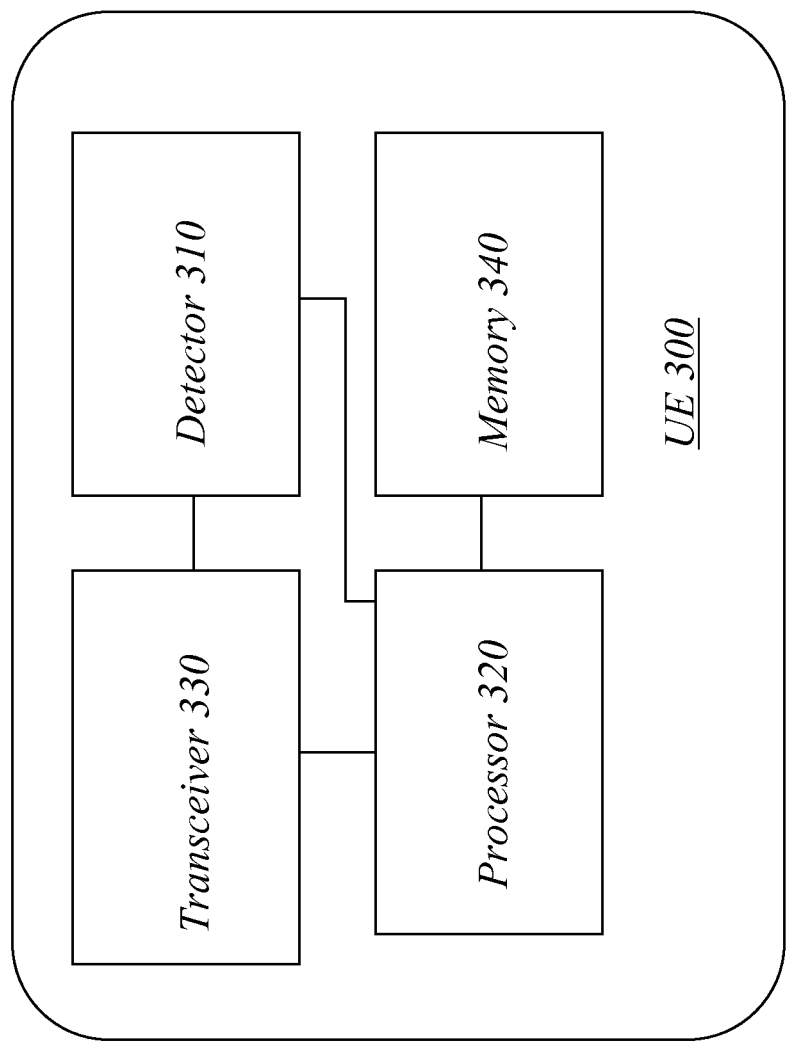
FIG. 3 illustrates schematically a user equipment according to an embodiment of the present invention.

As illustrated in FIG. 3 a UE 300 according to an embodiment is schematically illustrated. The UE comprises a transceiver 330 for wireless communication with base stations and a detector 310 configured to measure RSRP and CINR. The UE further comprises a processor 320 configured to determine a geometry measure (G). G is according to one embodiment equal to RSRP for the serving cell divided by a sum of RSRP for remaining base stations that the UE detects or according to a further embodiment equal to RSRP for the serving cell divided by a sum of RSRP for remaining base stations that the UE detects plus additional noise. The processor 320 is further configured to estimate the CINR at full load by using the geometry measure (G) and to estimate the relative load by dividing G by CINR.

The transceiver 330 is also configured to report the estimated relative load to the network according to an embodiment.

The UE may also comprise a lookup table 340 which maps the relative load to a certain number of users in the cell of the serving cell. The lookup table may also be located in the network. To be able to make the estimation for the lookup table, knowledge of the services used and mix between services are necessary.

The functionalities of the UE can be implemented by the processor 320 associated with a memory 340 storing software code portions as illustrated in FIG. 3. The processor runs the software code portions to achieve the functionalities of the UE according to embodiments of the present invention.

The relative network load may be translated into absolute load figures throughout model training. Further development of the translation through reference system simulations and empirical testing may be performed.

In a further embodiment, the estimated load may be reported to the network. For example by using a field standardized for this purpose or possibly using already existing reporting fields.

The network may use the load estimate when taking handover decisions; e.g. applying larger margins when the load is high and smaller margins when the load is low. The UE can also use these load estimations for field testing purposes, to be able to continuously get a figure for the interference load in the network.

The estimated load may also be useful as input to algorithms, to create possibilities for load based algorithms and be used for throughput prediction.

Moreover, the estimated load may be used as input to a throughput (performance) prediction algorithm that could operate without accessing the network. For example, to make a representative signal quality to bitrate lookup, the used signal quality measure must contain information reflecting the interference from neighboring cells.

According to one embodiment, the relative load is mapped to a certain number of users in the cell of the serving cell. Hence, a lookup table may be provided which maps the estimated load to a certain number of users in the serving cell. However knowledge of traffic pattern and the mixture of services are necessary to be able to do this lookup.

Thus the proposed solution provides a method to estimate the network load taking interference from neighboring cells into account. In accordance with a further alternative, by using information of interference from other cells derived from the L expression, the signal quality to throughput lookup can be estimated.

The invention claimed is:

1. A method, in a user equipment, UE, for estimating a relative load in a network, the network including a plurality of base stations, one of the base station being a serving base station to the UE, the method comprising:
    measuring a Reference Symbol Received Power, RSRP, for each base station the UE detects;
    measuring a carrier to interference and noise ratio, CINR;
    determining a geometry measure, G, G being equal to an RSRP for a serving cell of the serving base station divided by at least a sum of RSRPs for remaining base stations that the UE detects;
    estimating the CINR at full load by using the geometry measure, G; and
    estimating the relative load by dividing G by CINR.

2. The method according to claim 1, wherein the geometry measure, G, is determined as being equal to RSRP for the serving cell divided by the sum of RSRPs for remaining base stations that the UE detects plus additional noise.

3. The method according to claim 1, further comprising:
    reporting the estimated relative load to the network.

4. The method according to claim 1, further comprising:
    mapping the relative load to a number of users in the serving cell.

5. The method according to claim 1, wherein the geometry measure, G, is determined as being equal to RSRP for the serving cell divided by the sum of RSRPs for remaining base stations that the UE detects plus additional noise, the method further comprising:
    reporting the estimated relative load to the network.

6. The method according to claim 1, wherein the geometry measure, G, is determined as being equal to RSRP for the serving cell divided by the sum of RSRPs for remaining base stations that the UE detects plus additional noise, the method further comprising:
   mapping the relative load to a number of users in the serving cell.

7. The method according to claim 1, wherein the geometry measure, G, is determined as being equal to RSRP for the serving cell divided by the sum of RSRPs for remaining base stations that the UE detects plus additional noise, the method further comprising:
   reporting the estimated relative load to the network; and
   mapping the relative load to a number of users in the serving cell.

8. The method according to claim 1, further comprising:
   reporting the estimated relative load to the network; and
   mapping the relative load to a number of users in the serving cell.

9. A user equipment, UE, for estimating a relative load in a network, the network including a plurality of base stations, one of the plurality of base stations being a serving base station to the UE, the UE comprising:
   a detector configured:
      to measure a Reference Symbol Received Power, RSRP, for each base station the UE detects; and
      to measure a carrier to interference and noise ratio, CINR; and
   a processor configured:
      to determine a geometry measure, G, G being equal to an RSRP for a serving cell of the serving base station divided by at least a sum of RSRPs for remaining base stations that the UE detects;
      to estimate the CINR at full load by using the geometry measure, G; and
      to estimate the relative load by dividing G by CINR.

10. The UE according to claim 9, wherein the processor is further configured to determine G as being equal to RSRP for the serving cell divided by the sum of RSRPs for remaining base stations that the UE detects plus additional noise.

11. The UE according to claim 9, further comprising:
   a transceiver configured to report the estimated relative load to the network.

12. The UE according to claim 9, further comprising:
   a lookup table configured to map the relative load to a number of users in the serving cell.

13. The UE according to claim 9, wherein the processor is further configured to determine G as being equal to RSRP for the serving cell divided by the sum of RSRPs for remaining base stations that the UE detects plus additional noise, the UE further comprising:
   a transceiver configured to report the estimated relative load to the network.

14. The UE according to claim 9, wherein the processor is further configured to determine G as being equal to RSRP for the serving cell divided by the sum of RSRPs for remaining base stations that the UE detects plus additional noise, the UE further comprising:
   a lookup table configured to map the relative load to a number of users in the serving cell.

15. The UE according to claim 9, wherein the processor is further configured to determine G as being equal to RSRP for the serving cell divided by the sum of RSRPs for remaining base stations that the UE detects plus additional noise, the UE further comprising:
   a transceiver configured to report the estimated relative load to the network; and
   a lookup table configured to map the relative load to a number of users in the serving cell.

16. The UE according to claim 9, further comprising:
   a transceiver configured to report the estimated relative load to the network; and
   a lookup table configured to map the relative load to a number of users in the serving cell.

\* \* \* \* \*